(12) United States Patent
Martens et al.

(10) Patent No.: US 7,397,734 B2
(45) Date of Patent: *Jul. 8, 2008

(54) APPARATUS AND METHOD FOR RECORDING AN INFORMATION ON A RECORDABLE OPTICAL RECORD CARRIER USING OVAL SPOT PROFILE

(75) Inventors: Hubert Cécile François Martens, Eindhoven (NL); Erwin Rinaldo Meinders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

This patent is subject to a terminal disclaimer.

(21) Appl. No.: 10/537,065

(22) PCT Filed: Nov. 6, 2003

(86) PCT No.: PCT/IB03/50019

§ 371 (c)(1),
(2), (4) Date: Jun. 1, 2005

(87) PCT Pub. No.: WO2004/053855

PCT Pub. Date: Jun. 24, 2004

(65) Prior Publication Data

US 2006/0072423 A1 Apr. 6, 2006

(30) Foreign Application Priority Data

Dec. 6, 2002 (EP) .................................. 02080151

(51) Int. Cl.
*G11B 7/00* (2006.01)

(52) U.S. Cl. ................. 369/44.23; 369/112.02
(58) Field of Classification Search ....................... None
See application file for complete search history.

(56) References Cited

U.S. PATENT DOCUMENTS

| | | | | |
|---|---|---|---|---|
| 4,609,813 | A * | 9/1986 | Cohen | 369/44.23 |
| 5,673,246 | A | 9/1997 | Ootaki et al. | |
| 6,026,072 | A * | 2/2000 | Taira et al. | 369/275.4 |
| 6,151,154 | A * | 11/2000 | Ogasawara et al. | 369/112.02 |
| 6,201,777 | B1 * | 3/2001 | Tsuchiya et al. | 369/112.23 |
| 6,661,415 | B1 * | 12/2003 | Yasuda et al. | 369/112.02 |

FOREIGN PATENT DOCUMENTS

| | | |
|---|---|---|
| EP | 0775998 | 5/1997 |
| EP | 1160779 A | 12/2001 |
| JP | 61248253 A * | 11/1986 |
| JP | 02078031 A * | 3/1990 |

* cited by examiner

*Primary Examiner*—Joseph Feild
*Assistant Examiner*—Peter Vincent Agustin

(57) ABSTRACT

A method and a corresponding apparatus for recording an information on a recordable optical record carrier (2) by irradiation of a light beam through an optical system (3-7) onto said record carrier (2) for forming marks and lands representing said information along an information recording direction (t), obtains a higher recording density, and thus higher data capacity, by using astigmatism for influencing the light beam from the light source (8) to the record carrier (2) during recording of information so as to obtain a light beam having a substantially oval spot profile having a shorter axis in the information recording direction (t), i.e., the tangential direction for an optical disc, compared to the direction (r) orthogonal thereto, i.e., the radial direction.

9 Claims, 8 Drawing Sheets

APPARATUS AND METHOD FOR RECORDING AN INFORMATION ON A RECORDABLE OPTICAL RECORD CARRIER USING OVAL SPOT PROFILE

BACKGROUND OF THE INVENTION

1. Field of the Invention

The present invention relates to an apparatus for recording information on a recordable optical record carrier by irradiation of a light beam onto said record carrier for forming marks and lands representing said information along an information recording direction. The present invention relates further to a corresponding recording method, an optical record carrier and a computer program for implementing said method.

2. Description of the Related Art

The total data capacity of optical discs is determined by the radial and tangential data density. The radial density is determined by the data track pitch, the tangential data capacity by the shortest mark that can be written. For rewritable phase-change discs, re-crystallization at the trailing edge of a mark during writing of the next mark is used to obtain a mark of shorter length than the optical spot size. Typically, half of the mark is erased to end up with a crescent shaped mark. For the recently introduced Blu-ray Disc (BD), a total data capacity of 25 Gbyte can be recorded on a single recording layer of a 12 cm disc. The shortest length is 150 nm (d=1 code) while the optical spot is 300 nm in width (1/e radius of the optical spot is 150 nm).

A recordable (write-once) BD format is required in addition to the RW (rewritable) format. This so-called BD-R system should also achieve the high data-capacity of a BD RW system, i.e., 25 GB, to allow one-to-one copies. In recordable media, mark formation occurs when a threshold temperature is exceeded. The mark-formation corresponds to an irreversible change in the information layer, and effects comparable to the re-crystallization in rewritable media in principle do not occur. Thus, the marks that have been recorded in recordable media essentially reflect the optical/thermal profile that was present during the recording process. To reduce the mark length, thus to increase the tangential density, less laser power may be used to write a smaller mark. As a consequence, the modulation of these smaller mark, and thus signal-to-noise ratio, will drop as well. This can be similarly discussed for write-once media based on phase-change material as recording material. The as-deposited amorphous material will re-crystallize to form circularly shaped crystalline marks. Mark length reduction due to post heat is not possible.

U.S. Pat. No. 5,673,246 discloses an optical pick-up device which makes a numerical aperture of an object lens in a radial direction of an optical disc smaller than that in a tangential direction to a track on the optical disc. Thus, a spot diameter in the tangential direction to the track becomes smaller than that in the radial direction during read-out. Thus, it is possible to prevent degradation MTF (Modulation Transfer Function) as well as to accurately read data recorded on the disc.

SUMMARY OF THE INVENTION

It is therefore an object of the present invention to provide a recording apparatus and a corresponding recording method for recording information on a recordable optical record carrier by which data capacities can be achieved that are similar to the data capacities of corresponding rewritable optical record carriers.

This object is achieved according to the present invention by a recording apparatus comprising:

a light source for generating a light beam, and optical means for irradiating said light beam onto said record carrier, wherein said optical means comprise means for influencing said light beam from said light source to said record carrier during recording of information by use of astigmatism so as to obtain a light beam having a substantial oval spot profile having a shorter axis in the information recording direction compared to the direction orthogonal thereto.

This object is further achieved according to the present invention by a corresponding recording method.

The present invention is based on the idea to use a non-circular spot-profile for the recording process. If the spot-profile is elongated in the radial direction, an oval-like thermal profile on the recording layer is obtained, so that marks can be written that are narrow in tangential direction compared to their radial extent thus increasing the resolution. Such an oval spot profile is obtained, according to the present invention, by use of astigmatic aberration of the wavefront of the light beam. As a result of astigmatism, two focal 'lines' (ovals) are formed. By choosing the proper direction of the astigmatism during recording, an oval spot profile with the long axis in the radial direction is obtained. No optical power is thereby lost.

The proposed spot modification is also beneficial for high-speed write-once recording. At high recording speeds, thermal in-track interference may hamper the pit formation process. To reduce the thermal in-track interference, an ellipsoidal optical spot, such as obtained with the proposed modification, leads to less direct heating of the previously written pits.

According to a preferred embodiment, an astigmatism can be introduced into the light beam deliberately, for instance, by use of liquid crystal means, such as a liquid crystal cell, or by use of a simple cylindrical lens. Preferably, the liquid crystal cell is formed by a liquid crystal material filling a cylindrical-lens-shaped cavity. When properly designed, the application of electrical voltage will cause the liquid crystal molecules to change their orientation. This then results in a change of refractive index which allows the 'lens' to be turned on and off. In the off-state, the refractive index of the liquid crystal should match that of the cell, so that no optical effect is introduced.

Preferably, the cell is oriented tangentially or radially compared to the grooves on the disc. The best solution is to arrange the cell such that light in radial direction is affected by the liquid crystal cell. When the liquid crystal cell is off, light is focused on the disc resulting in a (nearly) circular spot. If then the liquid crystal cell is switched on, rays in the radial direction get a little bit defocused due to the cylindrical lens resulting in the desired oval spot-shape, radially broadened, narrower in tangential direction. It is also possible to use a cell which affects the tangential direction, but when it is then turned on, some re-focusing is required to get the desired spot-shape.

According to an alternative embodiment, the focus position of the focal lines of the light beam having an intrinsic astigmatism can be controlled such that a defocus is introduced during recording of information. Such an intrinsic astigmatism is generally produced by the light source used, in particular, by a laser diode itself. For instance, edge-emitting laser diodes always have some intrinsic astigmatism due to the internal shape of the device, i.e., the laser-mode is not fully confined to the optical gain region. This astigmatism only has the proper direction if the output of the laser is placed tangential or radial with respect to the grooves on the disc. The advantage is that no additional elements are required in the recording device.

Finally, the proper direction of the spot on the disc is controlled by the focus-offset. Both oval-directions can be obtained albeit at different focal distances, e.g., different focus-offset. In an optical drive the disc is kept into focus by electronic means, i.e., the height of the lens above the disc is controlled by actuators. The current through the actuators is such as to minimize a so-called focus-error signal. Deliberate defocus can be introduced by adding, e.g., an offset to the focus error signal. Such control means is present in existing drives for the purpose of active focusing, this control means being adapted, according to the present invention, for recording by use of an oval spot profile.

In addition, appropriate control means are provided for switching said means for influencing the light beam on or off, or for bringing said means into the light path during recording and for removing it thereafter, in particular, during read-out or RW-recording where spot-deformation is not desired. For instance, a cylindrical lens can be easily 'turned on and off' by mechanical placement of this lens in and out of the beam. Another possibility is to electrically switch a liquid crystal cell on or off.

The proposed solution can also be helpful in high-speed recording. The reason for this is that at high-speed recording, similar problems are found as with high-density recording. In high-speed recording, subsequent marks are written with very little timing-delay because of the high speed. A consequence is that neighboring marks are affecting each other via so-called thermal interference: heat present from the previous (next) mark influences the formation of the next (previous) mark. By using a spot that is narrower in the tangential direction, such effects can be reduced.

BRIEF DESCRIPTION OF THE DRAWINGS

The present invention will now be explained in more detail with reference to the drawings, in which.

DESCRIPTION OF THE PREFERRED EMBODIMENTS

Figure 1A:
FIGS. 1a and 1b show long and short marks recorded on rewritable and recordable record carriers with a circular spot profile.
Figure 1B:
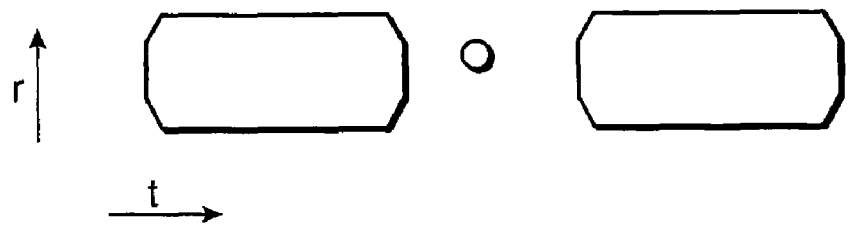

To achieve data capacities in write-once systems that are similar to the data capacities of corresponding rewritable systems, very narrow (in tangential direction t) marks need to be written at short run-lengths, while in rewritable media, the short marks are as broad (in radial direction r) as the long marks. In recordable media, the shortest marks are as broad as their lengths, i.e., have a circular shape. Thus, the width of the shortest marks decreases resulting in lower modulation during read-out. This is illustrated in FIGS. 1a and 1b showing a schematic drawing of long (8T) and short (2T) marks recorded in rewritable (RW) media (FIG. 1a) and recordable (R) media (FIG. 1b) at high density. It should be noted that the shortest marks are comparable or smaller than the optical spot profile. The consequence is that during read-out, the optical modulation of the shortest marks in recordable media vanishes.

This problem can also be illustrated as well by comparing the resolution ($=2T_{pp}/8T_{pp}$) of the 2T marks for BD-RW and BD-R at a density of 23 GB. According to the BD-RW specification, the 2T resolution should be larger than 10%, and this is met in practice. However, so far even in the best BD-R media, the resolution at 23 GB is at most 5%. This poor resolution significantly deteriorates the jitter. The current invention provides a solution to write small but broad marks, i.e., having a high tangential density, such that a high modulation is preserved.

Figure 2A:
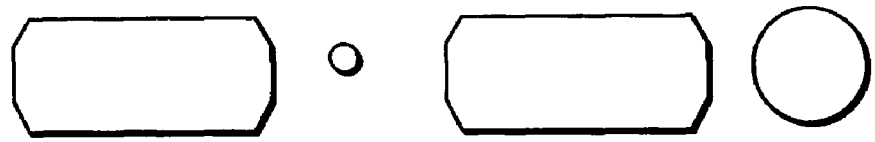
FIGS. 2a and 2b show long and short marks recorded with a circular and an oval spot profile, respectively, on recordable record carriers.
Figure 2B:
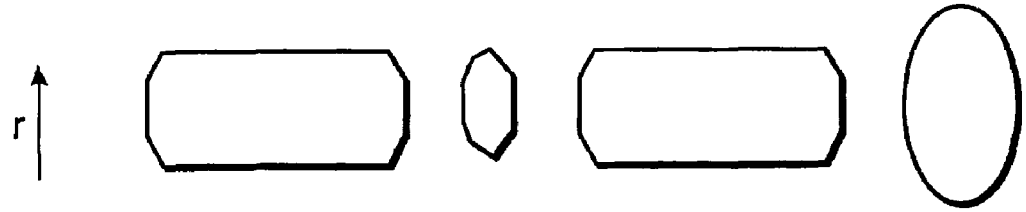

FIGS. 2a and 2b show a schematic drawing of long (8T) and short (2T) marks both recorded on a recordable medium. The marks shown in FIG. 2a have been recorded using a circular spot shown on the right-hand side, while the marks shown in FIG. 2b have been recorded using an oval spot shown at the right-hand side, said oval spot having a shorter axis in the tangential direction t compared to the axis in the radial direction r. As can be seen, the marks shown in FIG. 2b are narrow in the tangential direction t compared to their radial extent and compared to the marks shown in FIG. 2a. Thus, the desired increase of the resolution can be obtained.

Figure 3A:
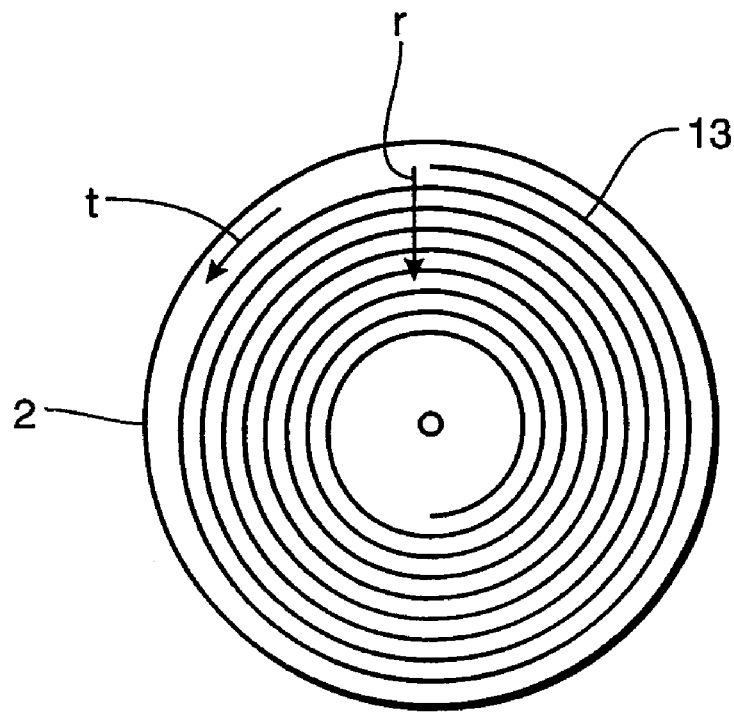
FIGS. 3a and 3b show an optical disc according to the present invention.
Figure 3B:
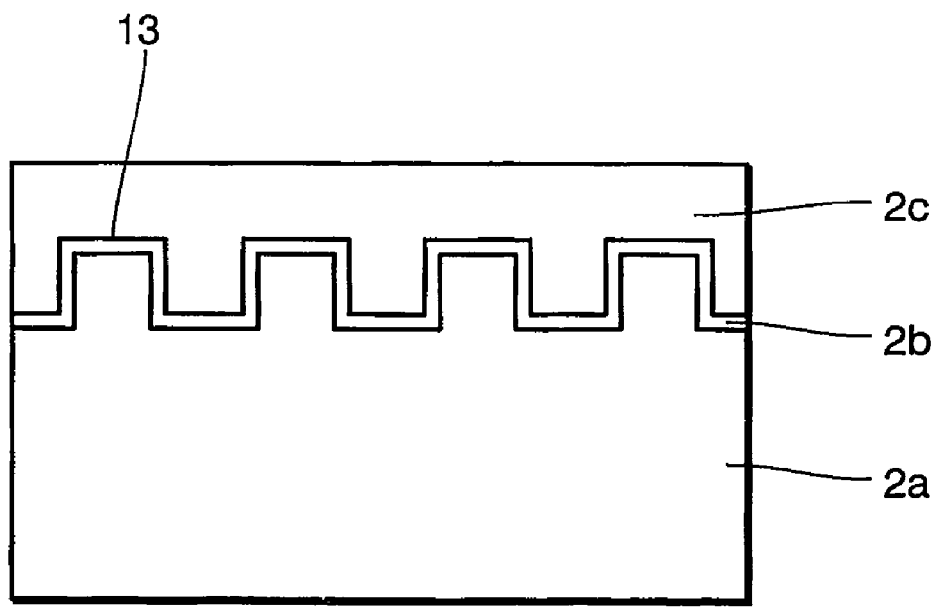

FIGS. 3a and 3b show a recordable optical disc according to the present invention in a top-view (FIG. 3a) and in a cross-sectional view (FIG. 3b). The disc 2 comprises a number of spiral grooves 13, which indicate the direction in which the information is recorded on the disc 2, i.e., the information is recorded along said spiral grooves 13. The tangential direction t and the radial direction r are further indicated in FIG. 3a.

FIG. 3b shows, in a cross-sectional view, the different layers of the disc 2 which, in general, include a substrate layer 2a, a recording layer or recording stack 2b and a cover layer 2c.

Figure 4:
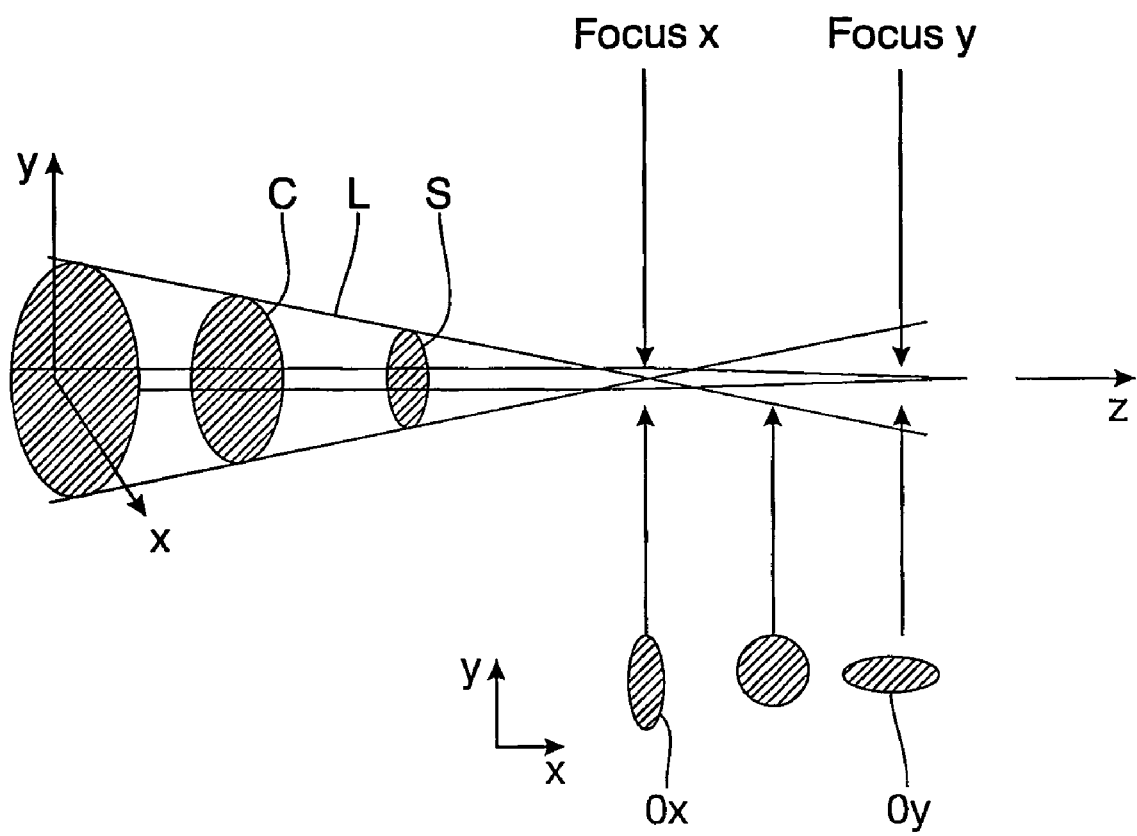
FIG. 4 illustrates the effect of astigmatism.

FIG. 4 illustrates the effect of astigmatism. In it's simplest form, astigmatism means that for a focused beam of light traveling in the z-direction, the focal distance of the beam is different in two perpendicular directions, e.g., the x- and y-directions. Astigmatism can be achieved by putting a cylindrical lens C in the light-path L. This cylindrical lens C causes light in one direction, for instance x, to be bended, but does not affect the light in the y-direction. If a normal (spherical) lens S, e.g., the objective lens of an optical recorder, is placed behind this cylindrical lens C, the result will be that light in the x-direction will be focused first, which was already somewhat bended by the cylindrical lens C, while the y-direction is not yet fully focused. This will result in a line-shaped (or oval) focus Ox. At a somewhat further distance, the y-direction will be in complete focus but, at the same time, the x-direction is already beyond focus resulting again in a line-shaped (oval) focus Oy perpendicular to the first one.

Figure 5:
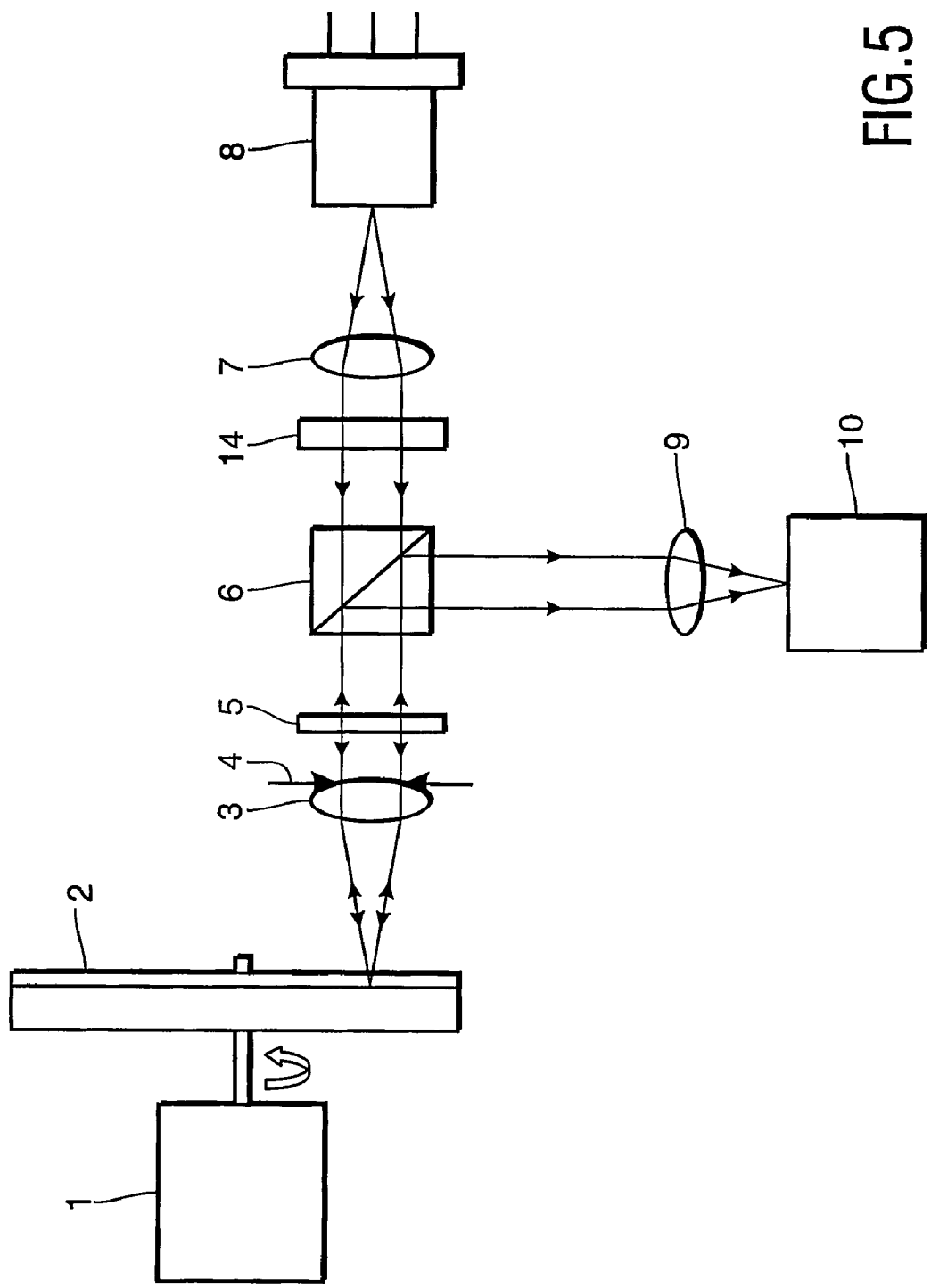
FIG. 5 shows a first embodiment of a recording apparatus according to the present invention.

A first embodiment of a recording apparatus according to the present invention is schematically shown in FIG. 5. During recording or read-out, the disc 2 is rotated by rotating means 1. A light beam generated by a light source, in particular, a laser diode 8, is focused onto the disc by an objective lens 3 after the light beam has passed a collimator lens 7, a liquid crystal cell 14, a polarizing beam splitter 6, a quarter-wave plate 5 and a diaphragm 4 for aperture limitation. During read-out, the polarizing beam splitter 6 reflects light reflected from the disc 2 through a lens 9 onto a photo detector (array) 10 for analyzing the reflected light. The general function of such a recording apparatus is widely known and shall therefore not be explained further here. Switching of the liquid crystal cell 4 can be done electrically.

The liquid crystal cell is formed by a liquid crystal material filling a cylindrical-lens-shaped cavity. When properly designed, the application of electrical voltage to the cell will cause the liquid crystal molecules to change their orientation. This then results in a change of refractive index which allows the 'lens' to be turned on and off. In the off-state, the refractive index of the liquid crystal should match that of the cell, so that no optical effect is introduced. Preferably, the liquid crystal cell is radially oriented so that light in the radial direction is affected.

Figure 6:
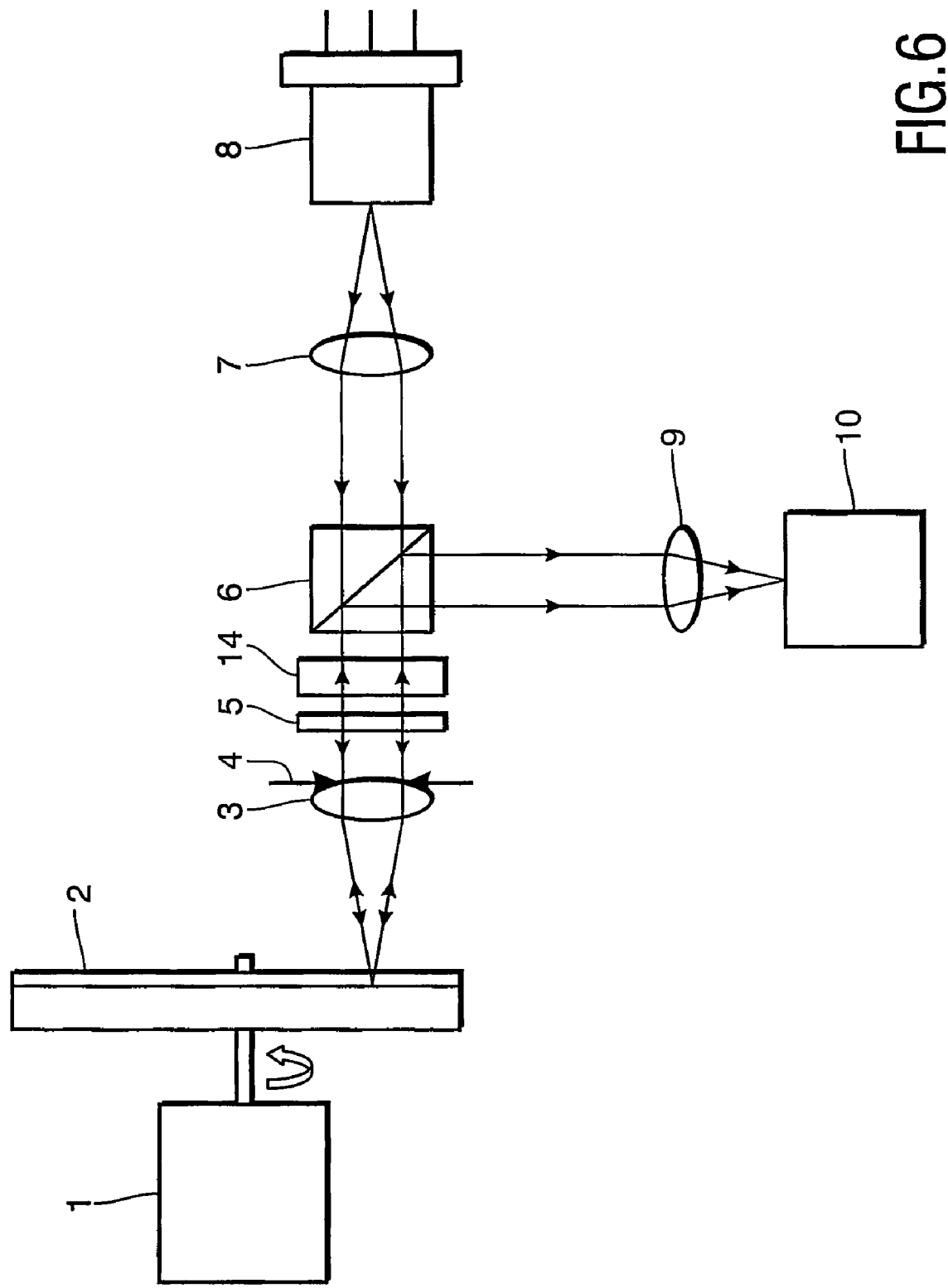
FIG. 6 shows a second embodiment of a recording apparatus according to the present invention.

Instead of the liquid crystal cell 14, a cylindrical lens may be alternatively placed in the light beam as well, in which the cylindrical lens is mechanically positioned in and out of the light beam. Further, either the liquid crystal cell 14 or the cylindrical lens can also be positioned between the quarter-wave plate 5 and the polarizing beam splitter 6 as shown in FIG. 6.

Figure 7:
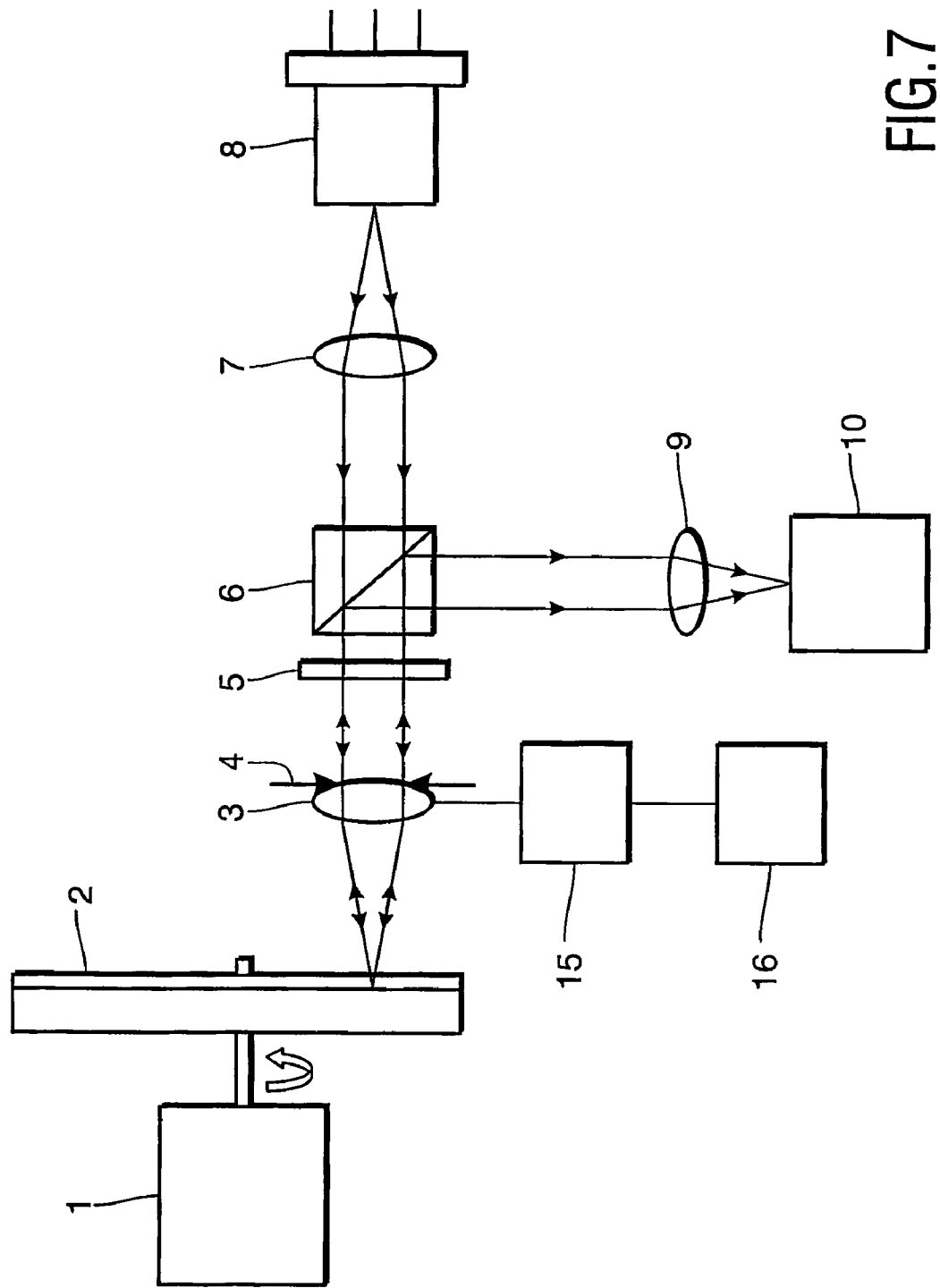
FIG. 7 shows a third embodiment of a recording apparatus according to the present invention.

FIG. 7 shows another embodiment of a recording apparatus according to the present invention. Therein, focus control means 15 is provided for controlling the height of the objective lens 3 above the disc 2, e.g., by appropriate actuators (not shown). The current through the actuators is controlled so that a so-called focus-error signal is minimized.

In this embodiment, use is made of the intrinsic astigmatism which is generally produced by the light source 8 used, in particular, by a laser diode itself. In case of recording, the focus control means 15 can be (partially) disabled, for instance, electrically or mechanically, or a defocus can be deliberately introduced by adding, e.g., an offset to the focus error signal during recording of information by an offset setting means 16 which can be turned on and off.

Figure 8:
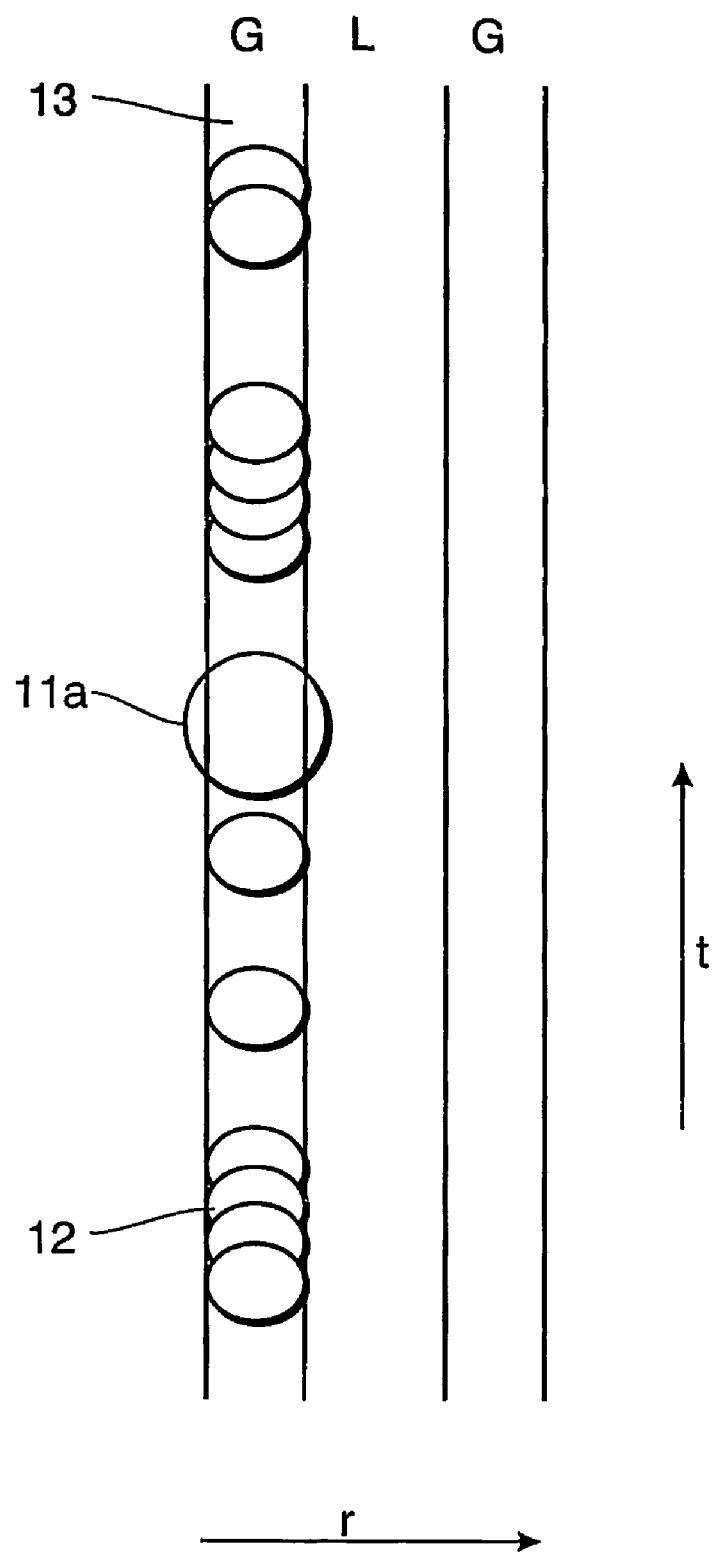
FIG. 8 shows the optical spot profile used for read-out of data.

The focused optical spot profile and marks/pits obtained by the recording method according to the present invention in a groove G (13) separated from another groove G by a land area L are shown in FIG. 8. During reading along the information recording direction t (=tangential direction), a circular optical spot profile 11a is used. Shown are also the recorded marks 12 having an oval profile.

Figure 9:
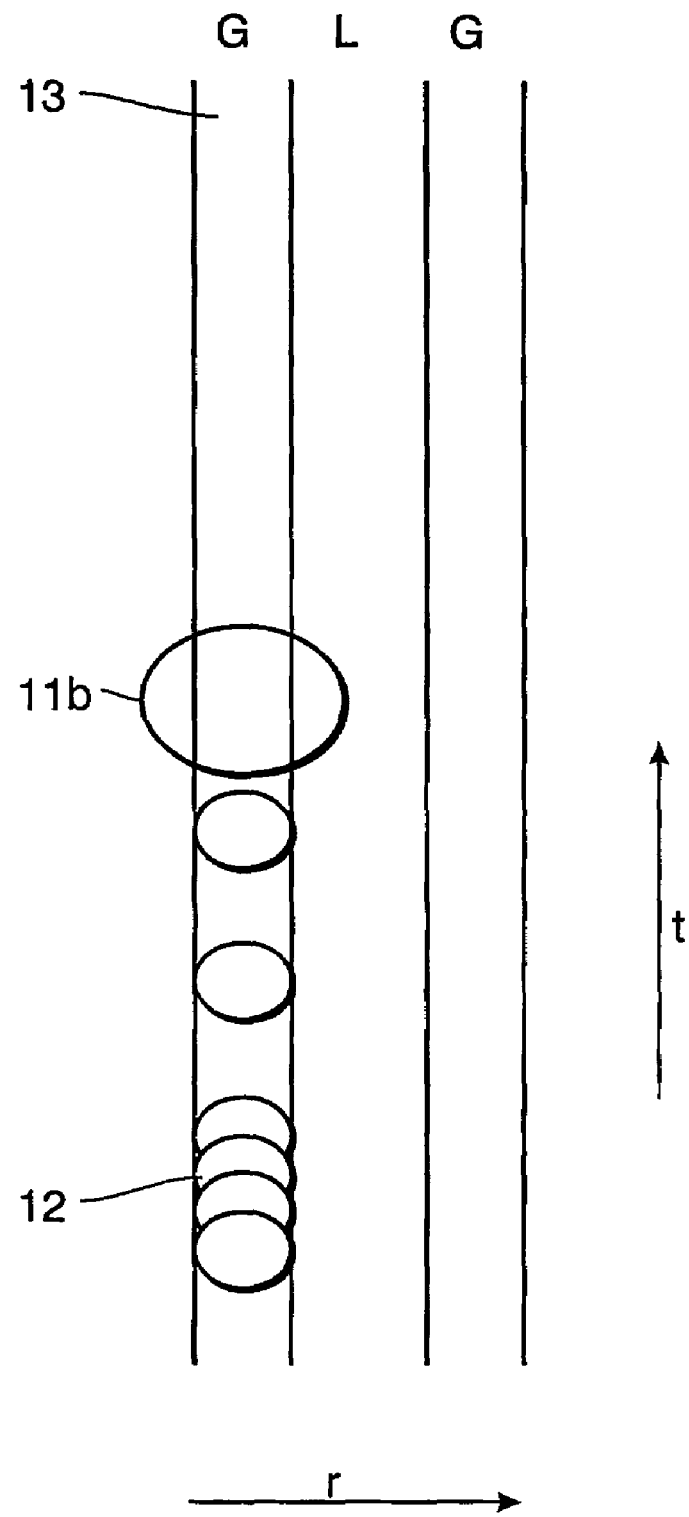
FIG. 9 shows the optical spot profile used for recording of data.

FIG. 9 shows the optical spot profile 11b used for recording of data. As can be seen, an oval spot profile 11b is used resulting in oval marks 12.

The present invention provides a solution to obtain higher data capacities when recording in particular on recordable optical record carriers. Astigmatism is used for influencing the light beam from the light source to the record carrier during recording of information according to the present invention to obtain a light beam having a substantially oval spot profile during recording, in particular, having a smaller width in the tangential direction compared to the width in radial direction.

The invention claimed is:

1. A recording apparatus for recording information on a recordable optical record carrier by irradiation of a light beam onto said record carrier for forming marks and lands representing said information along an information recording direction, comprising:
   a light source for generating a light beam; and
   optical means for irradiating said light beam onto said record carrier,
wherein said optical means comprises means for influencing said light beam from said light source to said record carrier during recording of information, said influencing means using astigmatism to obtain a light beam having a substantial oval spot profile having a shorter axis in the information recording direction compared to a radial direction orthogonal to the information recording direction,
and wherein said recording apparatus further comprises control means for controlling said means for influencing the light beam by switching said means on or off by positioning said means for influencing into the light path during recording.

2. The recording apparatus as claimed in claim 1, wherein said means for influencing the light beam introduces astigmatism into the light beam.

3. The recording apparatus as claimed in claim 2, wherein said means for influencing the light beam comprises a liquid crystal cell.

4. The recording apparatus as claimed in claim 3, wherein said liquid crystal cell has a cylindrical shape.

5. The recording apparatus as claimed in claim 2, wherein said means for influencing the light beam comprises a cylindrical lens.

6. The recording apparatus as claimed in claim 1, wherein said means for influencing the light beam comprises focus control means for controlling a focus position of focal lines of the light beam, said light beam having an intrinsic astigmatism, such that a defocus is introduced during recording of information.

7. The recording apparatus as claimed in claim 6, wherein said focus control means adds an offset to a focus error signal used for keeping the light beam into focus during recording of information.

8. A method of recording an information on a recordable optical record carrier by irradiation of a light beam through optical means onto said record carrier for forming marks and lands representing said information along an information recording direction, said method comprising the steps of:
   generating a light beam;
   irradiating said optical record carrier with said light beam, including, during recording of information, influencing said light beam, through the use of astigmatism, to have a substantially oval spot profile having a shorter axis in the information recording direction compared to a radial direction orthogonal to the information recording direction; and
   controlling said influencing of the light beam by switching said influencing on or off by positioning means for influencing into the light path during recording.

9. A computer-readable medium encoded with a computer program comprising instructions for causing a computer to perform the steps of the method as claimed in claim 8.

* * * * *